Sept. 4, 1928.  1,682,884
H. BROADLEY
ADVERTISING AND DISPLAY DEVICE
Filed May 26, 1927   3 Sheets-Sheet 1
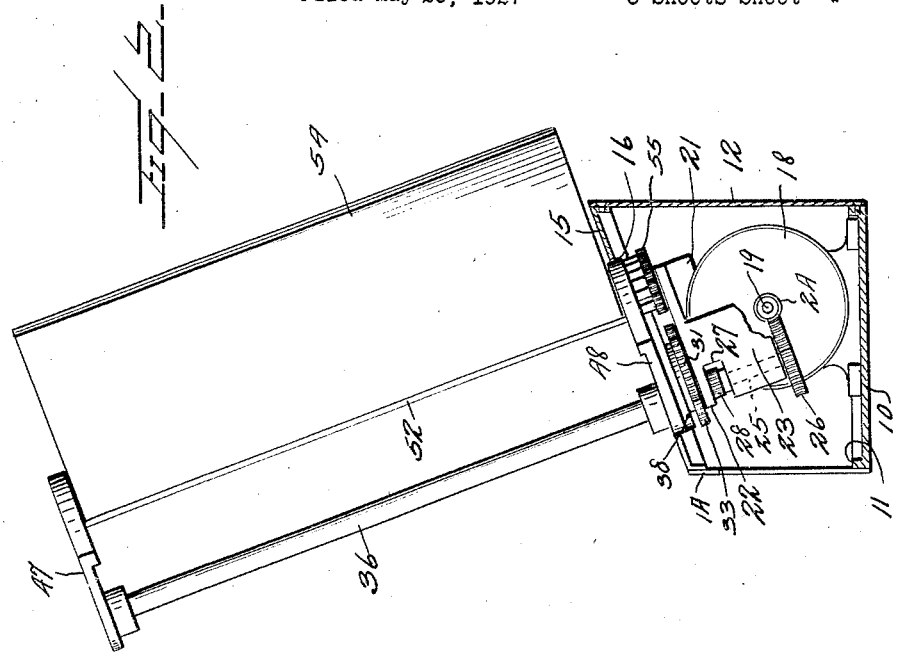
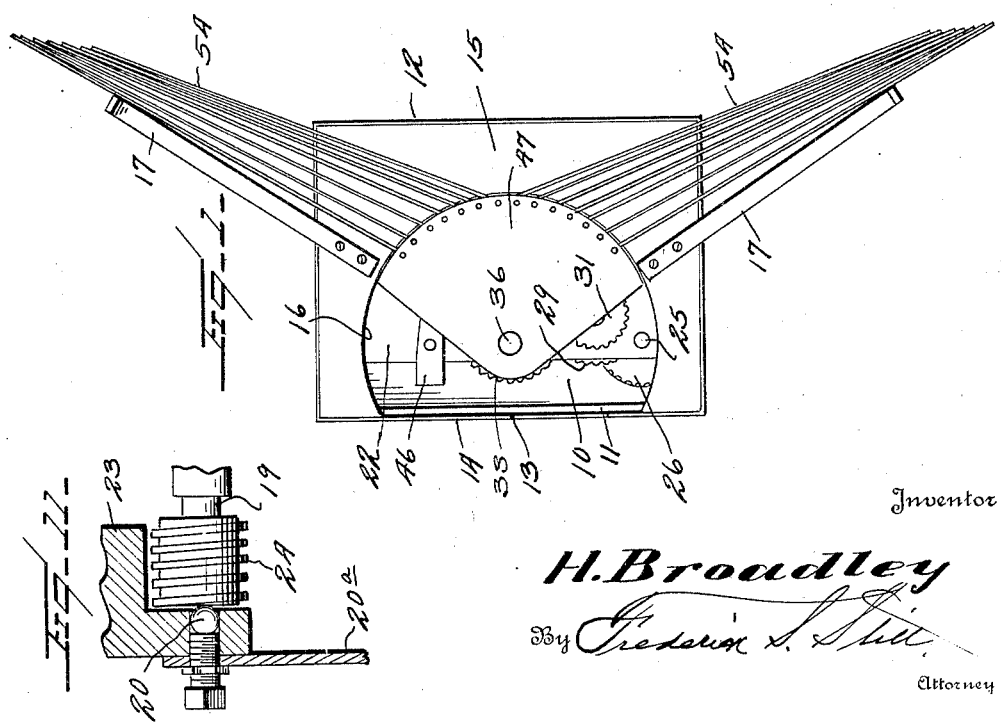
Inventor
H. Broadley
By Frederick L. Still
Attorney Sept. 4, 1928.  1,682,884
H. BROADLEY
ADVERTISING AND DISPLAY DEVICE
Filed May 26, 1927   3 Sheets-Sheet 2
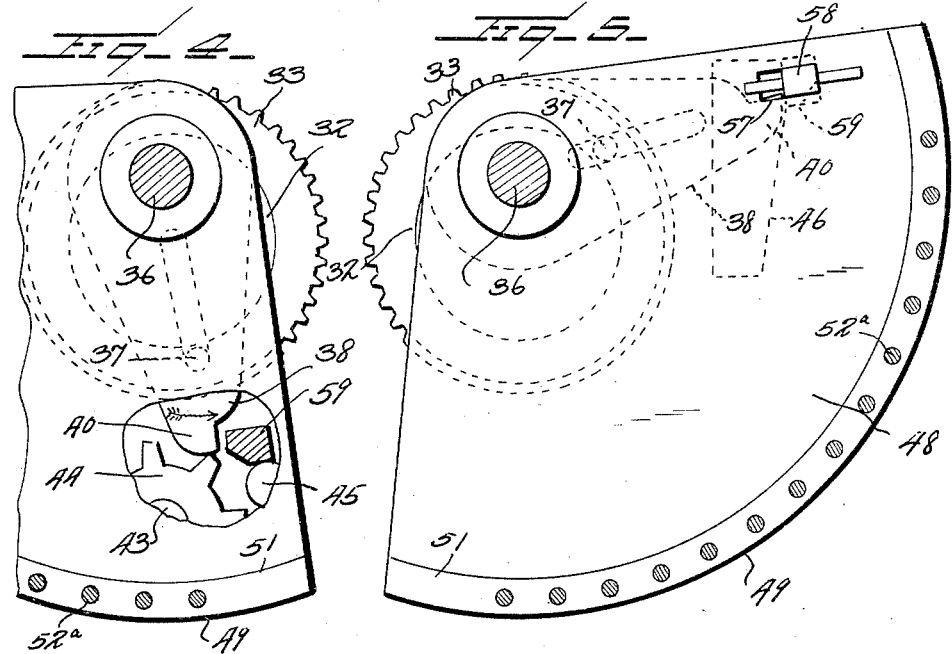
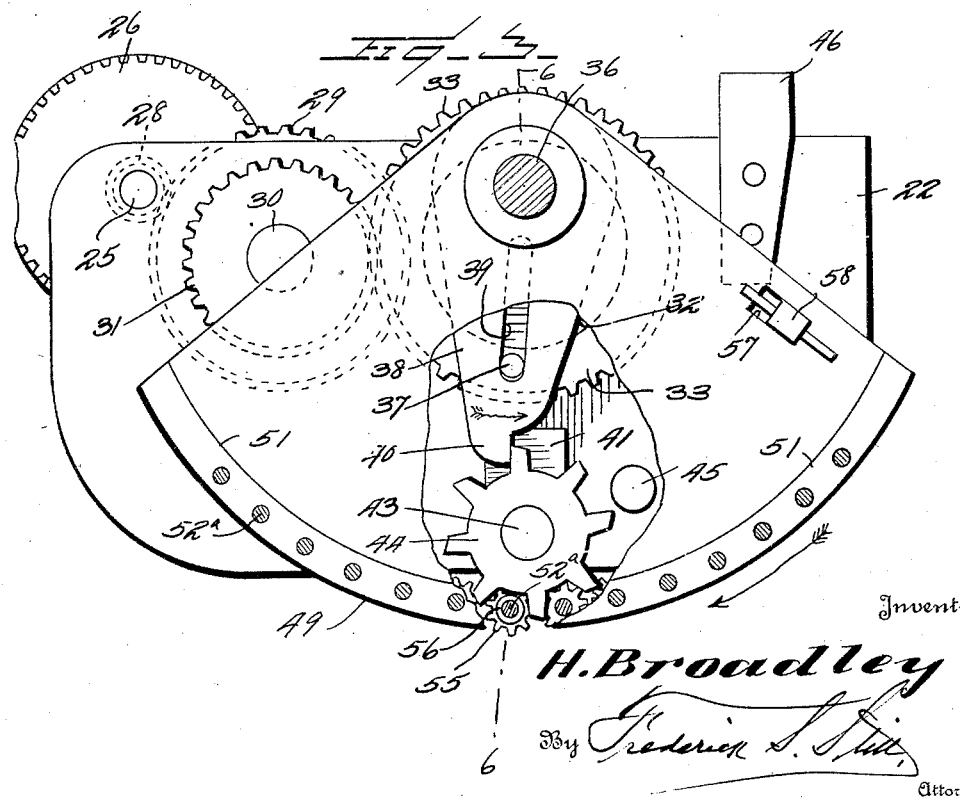
Inventor
H. Broadley
By Frederick S. Still,
Attorney

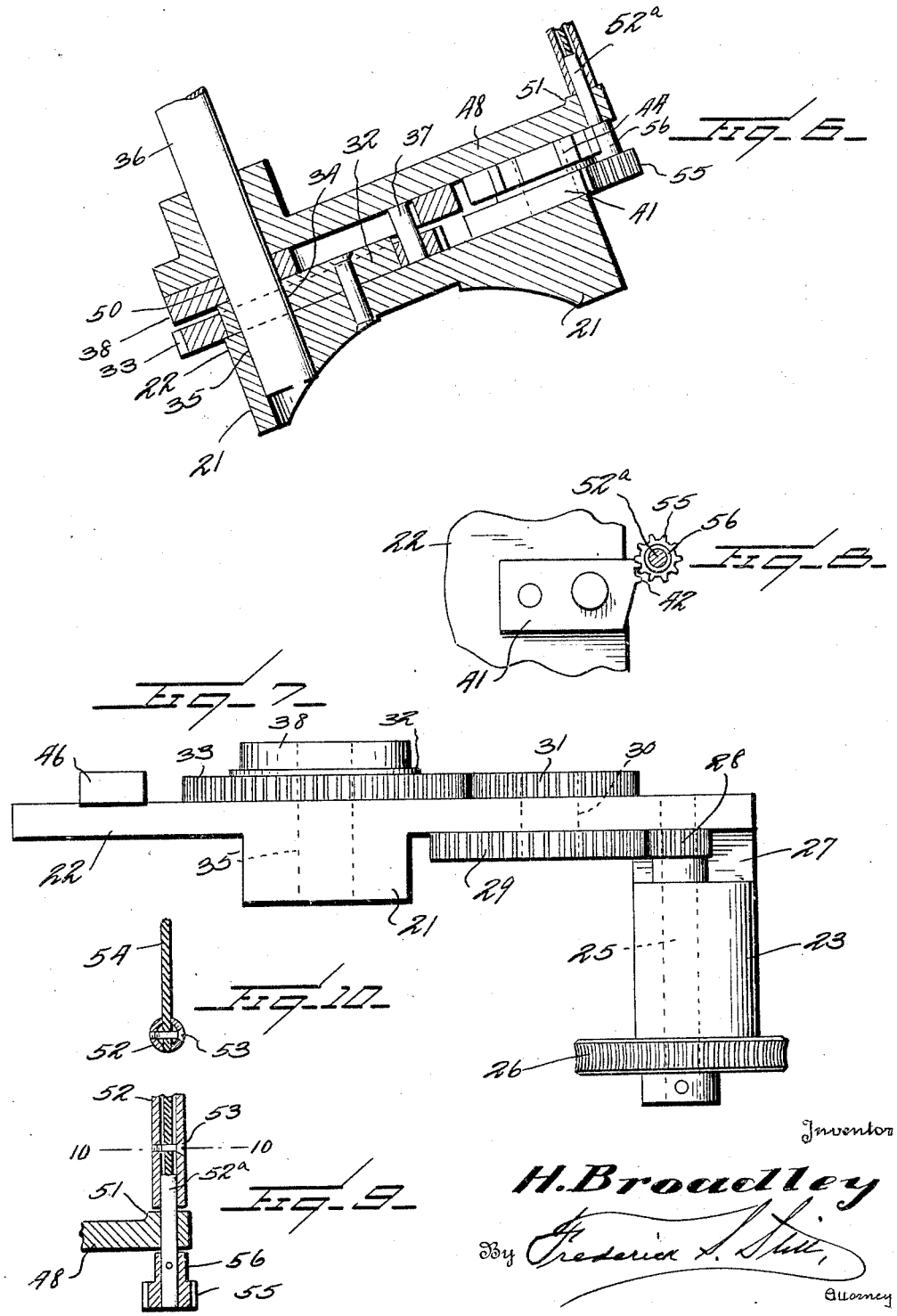

Patented Sept. 4, 1928.

1,682,884

UNITED STATES PATENT OFFICE.

HENRY BROADLEY, OF WALKERVILLE, ONTARIO, CANADA.

ADVERTISING AND DISPLAY DEVICE.

Application filed May 26, 1927. Serial No. 194,450.

This invention relates to advertising devices and particularly to those advertising devices in the form of books having leaves which are automatically turned to display the matter successively on successive leaves.

These display or advertising devices have heretofore been so constructed that while the leaves would turn in one direction one by one, the leaves are reversely turned one by one. Thus, each leaf must contain reading matter not connected with the reading matter on the next adjacent leaf as otherwise when the leaves were reversed, the reading matter would not read progressively but would be read reversely.

The general object of the present invention is to provide a display or advertising device in the form of a book in which the leaves will be turned from right to left in the usual manner so that the leaves will be read properly as the leaves of an ordinary book would be read, and provide means whereby all of the leaves may be simultaneously turned in the reverse direction to return the book to its initial position.

A further object is to provide a construction of this character in which the leaves are reversely turned very quickly so that after the book has been turned in its usual direction and the leaves swung over one by one, all of the leaves will be simultaneously turned to their initial positions rapidly and the operation of returning the leaves started over again.

Other objects have to do with the details of construction and arrangement of parts whereby these results are accomplished.

My invention is illustrated in the accompanying drawings wherein:—

Figure 1 is a top plan view of my display mechanism;

Fig. 2 is a side elevation of the mechanism with the base housing in section;

Fig. 3 is a top plan view with the lower segmental plate broken away and the leaf spindles and supporting shaft in section showing the book in a middle position;

Fig. 4 is a top plan view partly broken away, showing the position of the parts as the book is about to return to its initial position;

Fig. 5 is a fragmentary top plan view with the book returned to an initial position;

Fig. 6 is a vertical section on the line 6—6 of Fig. 3;

Fig. 7 is a fragmentary elevation of the supporting plate and gearing;

Fig. 8 is a fragmentary top plan view of the supporting plate and pinion engaging rack and pinion;

Fig. 9 is a fragmentary vertical section through one of the leaf holding spindles and a portion of the lower supporting plate;

Fig. 10 is a section on the line 10—10 of Figure 9;

Fig. 11 is a fragmentary section through the base, showing the thrust bearing for motor shaft.

Referring to these drawings it will be seen that my machine comprises a base which is concealed by a housing and which contains the operating mechanism and a book or similitude thereof, having a plurality of leaves and mounted upon the base in an inclined position. The base consists of a base plate 10 having an upstanding flange 11 to which the housing 12 is connected. This housing 12 is preferably formed of sheet metal and extends around the base, there being a joint 13 and the back of the housing being cut away at 14. This housing supports the plate 15 having a circular opening 16 cut out therefrom and to which plate brackets 17 are attached, over which the leaves of the book operate and which act to support these leaves.

Mounted upon the base 10 is an electric motor 18. The shaft 19 of this motor bears against a thrust bearing 20 carried by the bracket 20ª. Supported upon the motor, as by the saddle 21, is a plate 22 which supports the gearing to be hereafter described. This plate 22 at one end has a downwardly extending portion 23 into which the shaft 19 passes. The shaft 19 carries upon it the worm 24 and mounted upon the plate 22 and extending downward in bearings in the portion 23 thereof is a shaft 25 carrying upon it a gear wheel 26 which is engaged by the worm 24. The portion 23 is cut away at 27 and disposed within this opening 27 is a pinion 28 carried upon the shaft 25. This pinion 28 engages with a gear wheel 29 carried by a short shaft 30 which extends through the plate 22, as shown in Figure 7, and mounted upon the upper end of this shaft 30 is a gear wheel 31 which rests upon the upper face of the plate 22.

Mounted rigidly upon the upper face of the plate 22 is an eccentric 32 and surrounding this eccentric 32 is an annular gear ring 33, the teeth of which are engaged by the gear wheel 31. This eccentric is formed with a circular socket 34 adjacent its rear edge face and this coincides with a circular bearing or socket 35 formed in the plate 22. In these sockets 34 and 35 the shaft 36 which supports the book proper is mounted. The gear ring 33 carries the upwardly extending pin 37. Disposed upon the face of the eccentric 32 is a pawl 38, this pawl having a longitudinally extending slot 39 into which the pin 37 projects. The extremity of this pawl is formed with a tooth 40.

Disposed upon the face of the plate 22 between the front of the plate and the gear ring 33 is a block 41 which extends beyond the face of the plate 22 and is formed with a pair of outwardly projecting teeth 42, these teeth projecting beyond the edge face of the plate 22. A central stud 43 projects upward from this plate and rotatably mounted upon this stud is a star wheel 44 having ratchet teeth, shown as eight in number. This ratchet wheel is free to rotate around the stud 43 and is actuated by the pawl 38. This pawl 38 is moved by the pin 37 on the gear ring 33 which operates within the slot 39. Projecting upward from the face of plate 22 at one side of the block 41, is a stud 45, whose function will be later stated, and attached to the plate 22 at its rear margin on the same side of the plate as the stud 45, is a stop plate 46.

The book, as it may be termed or the holder for the leaves thereof, consists of the longitudinally spaced plates 47 and 48. These are approximately segmental in form with rounded edges 49 and passing through or engaged with the apices of these segmental plates, is the shaft 36, previously referred to, which projects beyond the plate 48 so that it may be inserted through the aperture 50 in the pawl 38 and into the sockets 34 and 35. This shaft when so inserted will be inclined upward and rearward. The margins of the plates 47 and 48 are thickened at 51 and swingingly mounted in these marginal portions 51 are the leaf spindles 52, each spindle being formed in two sections held together by screws 53, a leaf 54 being clamped between these sections. Each spindle is reduced at its end at 52ª so as to fit into bearings formed in the plates 47 and 48 and each spindle at its lower end beyond the plate 48 carries upon it a pinion 55. These pinions are adapted to be successively engaged with the teeth 42 on the plate 41 as the segment 48 is swung transversely of the teeth 42. Inasmuch as each pinion 55 is moving relative to the fixed teeth 42, the pinion will be rotated and the corresponding leaf turned. Just above each pinion 55 the spindle 52ª is formed to provide a neck 56 with which the teeth of the star wheel 44 mesh. These several necks 56, therefore, constitute a rack and as the star wheel 44 is rotated step by step, the star wheel will engage this rack formed by the necks 56 of spindles 52 and will thus act to shift the plate 48 around the center formed by the shaft 36. The plate 48 is formed, adjacent one corner, with a slot 57 which extends approximately radial to the center upon which the plate 47 turns. In this slot is slidingly mounted a detent 58 having a tooth 59. This detent when shifted inward in the slot 57 will be disposed in the path of movement of the pawl 38 and will be engaged by the tooth 40 of this pawl and when shifted outward in the slot, will be out of the path of movement of this pawl. The post 45 acts to shift this detent inward into the path of movement of the pawl while the block 46 acts as a cam to shift the detent outward and, therefore, out of engagement with the tooth 40 on the pawl 38.

The operation of this mechanism is as follows:—The motor 18 drives the gear wheels 29 and 31 in a clockwise direction and, therefore, drives the gear ring 33 in a counter-clockwise direction. Inasmuch as this gear ring is connected by means of the pin 37 with the pawl 38, this pawl will be rotated at a variable speed in a counter-clockwise direction. Assuming that the plate 48 is swung over as far as it will go to the right as in Figure 5, then on each complete rotation of the gear ring 33 the pawl will engage one of the teeth 44 to shift it one step and this by the engagement with the neck 56 of the first spindle 52 of the series of spindles will cause the plate 48 and, of course, the plate 47, to move toward the left one step. As these segments or plates 47 and 48 move toward the left one step, the teeth 42 will engage the pinion 55 of the corresponding spindle 52 and act to rotate this spindle in a direction to cause the corresponding leaf 54 to turn toward the right. With each step taken by the segmental plates 47 and 48 a new leaf will be turned from the right toward the left or, in other words, will be opened, until eventually the segmental plate 48 will be in the position shown in Figure 4. As it reaches this position, the last leaf will have been turned and the detent or latch 58 will come in contact with the post 45 and this will cause the detent to be shifted inward and engaged with or latched to the tooth 40 of the pawl 38. The next movement of this pawl in a counter-clockwise direction will act, therefore, to carry the segment 48 backward to its initial position and as the segment 48 nears its initial position the lock or detent 58 will strike against the inclined outer face of the block or unlatching member 46 which will shift the detent out of engagement with the pawl and the parts will be in their initial position, as shown in Figure 5.

It will be seen that so long as the motor operates, the leaves of the book will be turned in their regular order from the right toward the left as the leaves of a book are ordinarily turned and that when all of the leaves have been turned, the book as a whole will be shifted backward to its initial position rapidly and again the leaves will be turned one by one.

This mechanism is very compact, simple, positively operated, and is entirely effective for the purpose intended. The number of leaves which will be operated depends entirely upon the number of spindles and the segments 47 and 48 and the position of the detent 58.

While I have illustrated a construction which I have found to be thoroughly effective in practice, I do not wish to be limited to the details shown as it is obvious that many changes might be made therein without departing from the spirit of the invention as defined in the appended claims.

I claim:—

1. A display mechanism including the similitude of a book comprising a plurality of rotatable spindles and leaves carried thereby and motor operated means causing the successive partial rotation of the spindles in one direction to thereby turn the leaves one by one in one direction and then causing the immediate reversal of all of the leaves to an initial position.

2. A display mechanism including an oscillatably mounted support, a plurality of individually oscillatable spindles carried thereby and bodily oscillatable therewith, each spindle carrying a leaf, motor operated means causing the step by step movement of the support in one direction and the successive partial rotation of the spindles in one direction and then causing the support to return to its initial position in one step and the coincident reverse movement of the spindles and leaves to their initial position.

3. A display mechanism including the similitude of a book, an oscillatably mounted support therefor, a plurality of rotatable spindles mounted in the support and oscillatable therewith, and leaves carried by the respective spindles, and motor operated means shifting the support in one direction step by step and at each step turning a leaf from an initial position to a display position and then automatically returning the support in one step to its initial position and simultaneously turning the leaves from their display position to the initial position.

4. A display mechanism including a base, a support oscillatably mounted upon the base, a plurality of spindles mounted in the support and carrying leaves, each of said spindles having a pinion, a base having means adapted to engage the successive pinions and rotate them as the support is swung in either direction, and motor operated means for causing the step by step movement of the support in one direction from an initial position to a final position and then causing the immediate return of the support to its initial position.

5. A display mechanism including a base, a support oscillatably mounted thereon, a rack mounted upon the support, a plurality of upstanding spindles carried by the support and carrying leaves, each of said spindles having a pinion, a member fixed upon the base and having a tooth engageable with successive pinions as the support is swung in either direction to thereby rotate the pinions, a gear wheel engaging the rack on said support, motor operated means for rotating the gear wheel step by step to carry the support in one direction from an initial position and means acting automatically when the support has fully moved in one direction to shift the support in the opposite direction to an initial position in one step.

6. A display mechanism including a base, an oscillatable support mounted thereon and having a plurality of upstanding spindles, leaves mounted upon the spindles, each spindle having a pinion, a motor, a ratchet wheel, a rack forming part of the support and with which the ratchet wheel is adapted to engage, a rotatable pawl engaging the ratchet wheel, once on each rotation of the pawl, to thus cause the step by step movement of the ratchet wheel and the step by step movement of the support in one direction, a motor for operating said pawl, a shiftable member carried by the support, means for shifting said member into engagement with the pawl when the support has moved in one direction to its full extent to thus cause the pawl by engagement with the shiftable member to carry the support in a reverse direction to the initial position, and means acting automatically to disengage the shiftable member from the pawl when the support has been shifted to its initial position.

7. A display mechanism including a base, an oscillatable segmental support having a depending stub shaft and having a plurality of upstanding spindles, each carrying a leaf, each spindle extending below the support and carrying at its lower end a pinion, the several pinions being separated from each other, a fixed eccentric carried on the base and having a socket adjacent its rear edge to receive said stub shaft, a gear ring carried by and rotatable around the eccentric, a pawl freely rotatable on the stub shaft and resting on the eccentric, the pawl being longitudinally slotted and the ring having a pin engaging in the slot to thereby rotate the pawl around its center at a variable speed, a member fixed on the base and having a tooth engaging successively with the pinions on the several spindles, a ratchet wheel above said member and engaging with said spindles to turn the support, the pawl on each revolution engaging a tooth of the ratchet wheel to thereby turn it one step and shift the support one step in the same direction, a motor operatively geared to the gear ring to drive it, means acting automatically to engage the support directly with said pawl when the support has been shifted in one direction to the full extent of its movement whereby to cause the pawl to return the support to an initial position, and means automatically disengaging the support from the pawl when the support has been returned to its initial position.

8. A display mechanism including a base, an oscillatable segmental support having a depending stub shaft and having a plurality of upstanding spindles, each carrying a leaf, each spindle extending below the support and carrying at its lower end a pinion, the several pinions being separated from each other, a fixed eccentric carried on the base and having a socket adjacent its rear edge to receive said stub shaft, a gear ring carried by and rotatable around the eccentric, a pawl freely rotatable on the stub shaft and resting on the eccentric, the pawl being longitudinally slotted and the ring having a pin engaging in the slot to thereby rotate the pawl around its center at a variable speed, a member fixed on the base and having a tooth engaging successively with the pinions on the several spindles, a ratchet wheel above said member and engaging with said spindles to turn the support, the pawl on each revolution engaging a tooth of the ratchet wheel to thereby turn it one step and shift the support one step in the same direction, a motor operatively geared to the gear ring to drive it, a slide mounted upon the support, means on the base engaging with said slide to cause the slide to move inward into direct engagement with the pawl when the support has been shifted in one direction to the full extent of its movement to thereby cause the pawl to return the support to an initial position, and means mounted upon the base and engaging said slide and shifting it out of engagement with the pawl when the support has been returned to its initial position.

In testimony whereof I affix my signature.

HENRY BROADLEY.